Sept. 17, 1929.  E. J. SISSER  1,728,374
GLUTEN WASHER
Filed Sept. 26, 1927   2 Sheets-Sheet 1
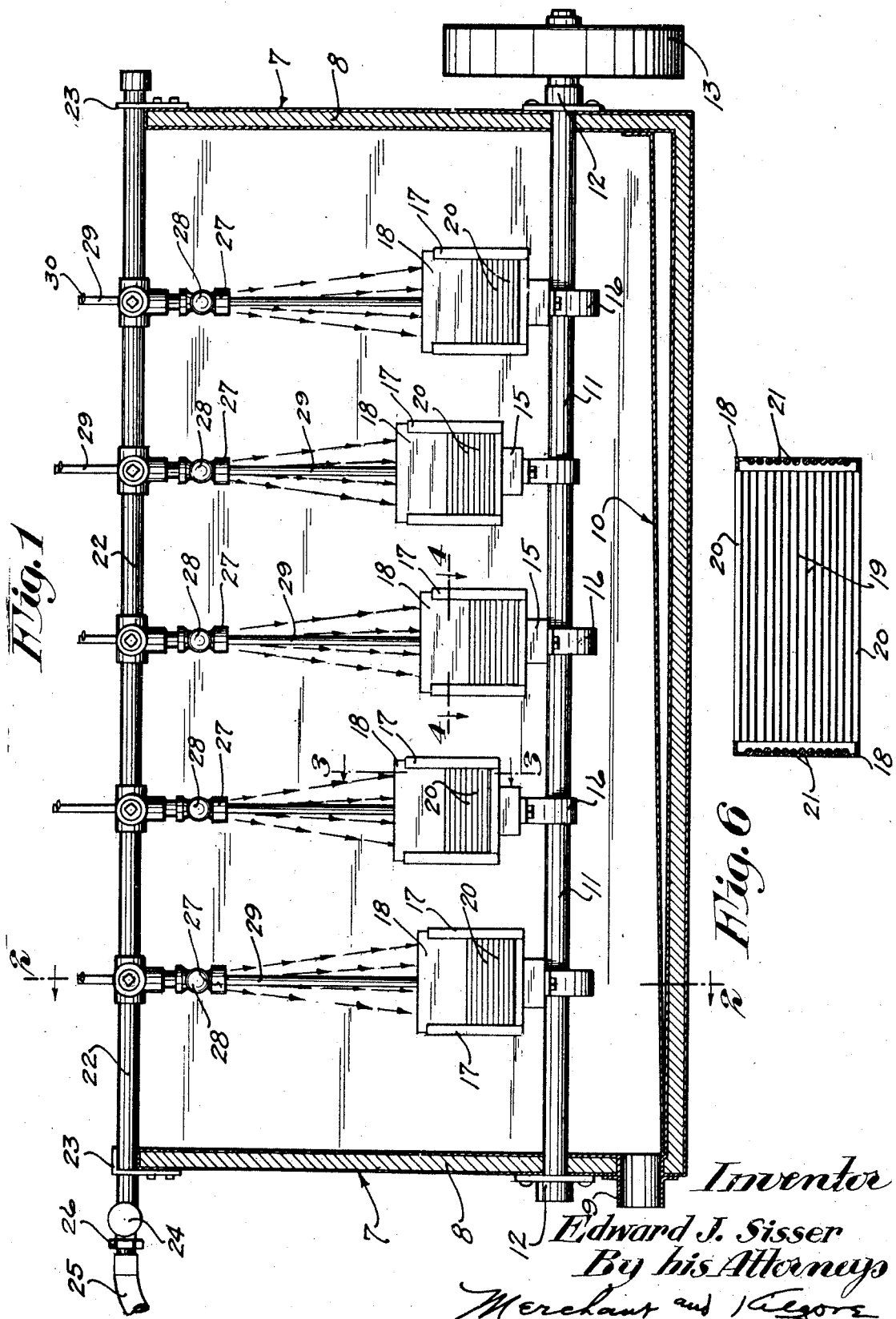
Inventor
Edward J. Sisser
By his Attorneys
Merchant and Kegore Sept. 17, 1929.  E. J. SISSER  1,728,374
GLUTEN WASHER
Filed Sept. 26, 1927  2 Sheets-Sheet 2
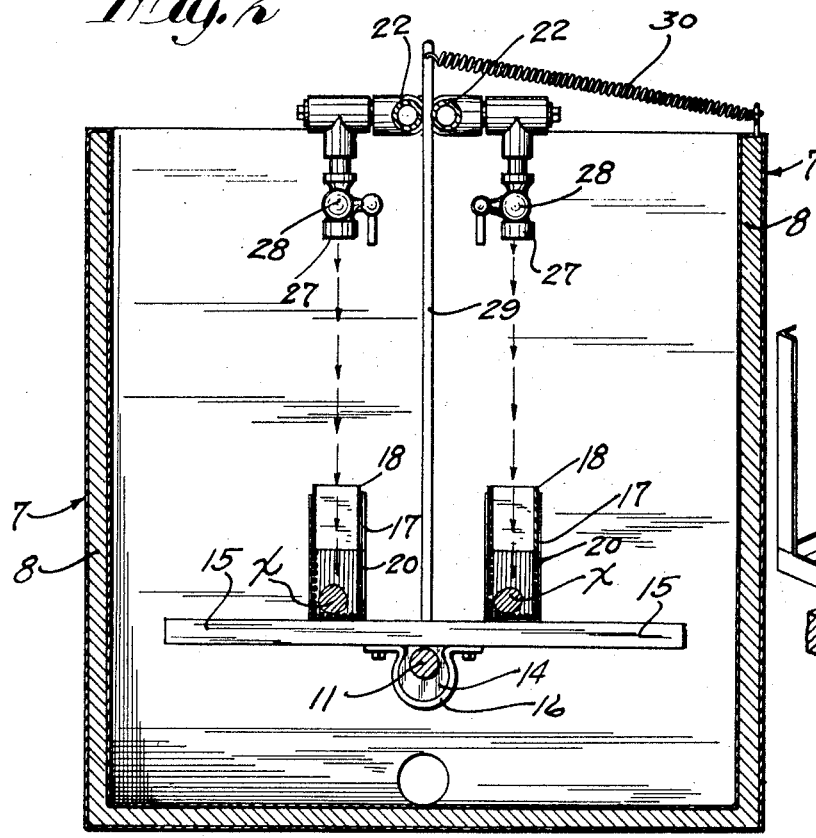
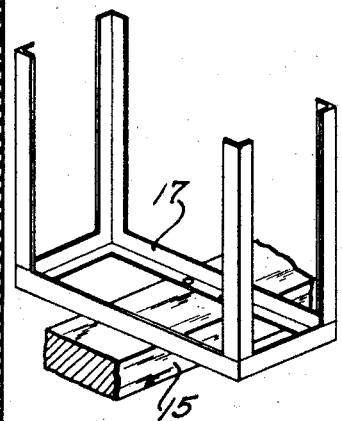
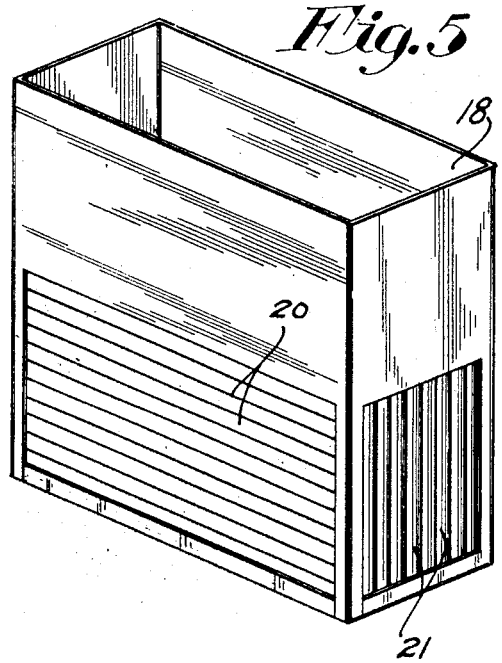
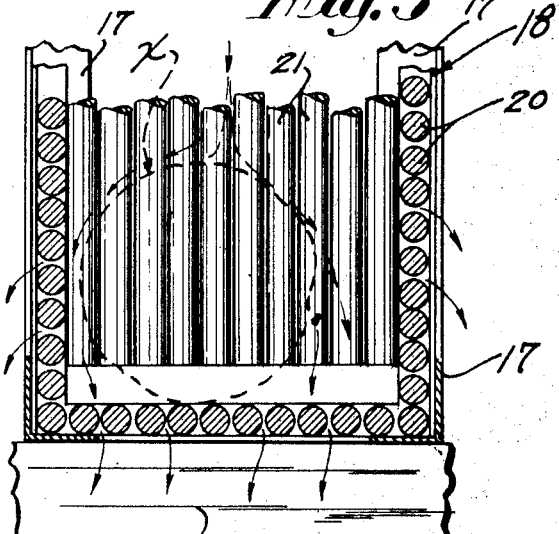
Inventor
Edward J. Sisser
By his Attorneys
Merchant and Kilgore Patented Sept. 17, 1929

1,728,374

UNITED STATES PATENT OFFICE

EDWARD J. SISSER, OF MINNEAPOLIS, MINNESOTA

GLUTEN WASHER

Application filed September 26, 1927. Serial No. 221,951.

My invention relates to a gluten washer, and has for its object the provision of a simple and highly efficient apparatus for use in quickly and efficiently removing starches from wheat flour for the purpose of obtaining the gluten.

The invention, in its preferred form, includes a novel cage gyrated by suitable mechanism at the proper speed to give a rolling and rubbing action to a piece of dough in the cage. Water is played on the dough in the gyrated cage to loosen the starches and flush them off through proper gauged crevices in the cage. This rolling and rubbing action of the dough in the gyrated cage produces a kneading action that brings the starches to the surface of the dough to be acted on by the water played thereon. All particles of dough broken by the force of the water on the dough in the cage as it is being gyrated are continually gathered by the rolling dough, thus preventing any loss of the gluten.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view partly in side elevation and partly in longitudinal central section;

Fig. 2 is a view principally in transverse vertical section taken on the line 2—2 of Fig. 1;

Fig. 3 is a fragmentary detail view principally in section taken on the line 3—3 of Fig. 1, on an enlarged scale;

Fig. 4 is a perspective view of one of the cage holders;

Fig. 5 is a perspective view of one of the cages; and

Fig. 6 is a view of one of the cages in horizontal section taken on the line 4—4 of Fig. 1, on an enlarged scale.

The numeral 7 indicates a sheet metal flush box or tank having a core 8 of wood or other suitable material. At one end of the box 7 is a short water drain pipe 9 and at the bottom of said box is a secondary bottom 10 arranged to cause water in the box 7 to flow to said drain. A horizontal shaft 11 extends longitudinally through the box 7 and is journaled in bearings 12 in the ends of said box. A belt pulley 13 is keyed to the opposite end of the shaft 11 from the drain pipe 9. Any suitable power means, including a belt arranged to run over the pulley 13, may be provided for driving the shaft 11, or in some instances, it might be desirable to operate the shaft 11 by a hand crank, not shown.

The shaft 11 is provided with a plurality of cranks 14 in the form of eccentrics alternately set 180 degress apart. Cross bars 15 extend transversely over the shaft 11 and are connected by eccentric straps 16, one to each eccentric 14. On each cross bar 15 is rigidly secured a pair of cage holders 17 in balanced relation and each thereof comprises a rectilinear skeleton base having a marginal retaining flange and at its corners upright angle posts. A cage 18 is removably mounted in each holder 17 for holding a batch of dough $x$. Each cage 18 is formed from sheet metal except its bottom, which comprises a plurality of closely positioned rods 19, and its sides and ends, the former of which has sections comprising closely positioned horizontal rods 20, and the latter of which has sections comprising closely positioned upright rods 21. Each cage 18 is removably supported on the base of one of the holders 17 within its retaining flange and corner posts.

A pair of laterally spaced water pipes 22 rest on the upper edges of the ends of the box 7 at the transverse center thereof and are held in position by keepers 23. These water pipes 22 are closed at one of their ends and connected at their other ends by a short cross pipe 24. Water is supplied to the pipes 22 from a hose 25 leading from any suitable source of water supply under pressure and attached by a coupling 26 to the pipe 24. The water pipes 22 are equipped with depending nozzles 27 arranged one over each cage 18 for spraying water directly therein, as indicated by arrows in Fig. 1. Each nozzle 27 is provided with a valve 28 for controlling the streams of water discharged therefrom.

Each cross bar 15 is provided with a rigidly secured upstanding stem 29 located directly over and perpendicular to the shaft 1, with its upper end portion extending between the water pipes 22 to engage the same and thereby hold the cross bar 15 from turning with the respective eccentric 14. Obviously, an endwise movement will be imparted to the stems 29 under the action of the eccentrics 14 and to prevent a slap between the stems 29 and water pipes 22, relatively light coil springs 30 are anchored to one of the sides of the box 7 and attached to the stems 29 above the water pipes 22 and yieldingly holds said stems in contact with one of said water pipes with freedom for raising and lowering movements.

The gyrated cage will cause the dough therein to be rubbed and rolled over the bottom rods 19 and against the horizontal rods 20 and upright rods 21 and thereby produce a kneading action to the dough. This kneading action works the starches to the surface of the dough where the same is acted on by the water discharged thereagainst. The rods 19, 20 and 21 also assist the water in removing the starches from the gluten by the rubbing of the dough thereagainst. Said rods are so gauged as to permit the flushing of the water and starches from the cages, but will prevent the escape of pieces of gluten therebetween that may be broken from the batch under the action of the water thereon. Any pieces of gluten broken from the batch by the force of the water thereagainst will be picked up by the batch during its rolling action within the cage.

The washing action of the gluten is continued until the water discharged from the flush box 7 is clear indicating that all of the starches have been removed from the gluten.

What I claim is:

1. In a gluten washer, a cage for holding a batch of dough and having a kneading surface, liquid escape passages, and means for gyrating the cage, to move the dough in the cage with a slapping action against said kneading surface without breaking said batch, and means for directing a stream of washing liquid on the batch while being kneaded.

2. In a gluten washer, a cage for holding a batch of dough and having at its bottom and sides closely positioned rods, means for operating the carge to impart thereto an intermittent oscillating movement, and means for directing a stream of washing liquid on said batch while being kneaded.

3. In a gluten washer, a cage for holding a batch of dough, means for operating the cage, and means for directing a stream of washing liquid on said batch while being kneaded.

4. In a gluten washer, a cage for holding a batch of dough, means for gyrating the cage, and means for directing a stream of washing liquid on said batch while being kneaded.

5. The structure defined in claim 4 in which the bottom and sides of the cage have closely positioned rods.

6. The structure defined in claim 4 in which the cage is rectangular in cross section and in which the bottom thereof is made up of closely positioned rods and in which the sides thereof have sections made up of closely positioned rods, certain of which are upright and certain others of which are horizontal.

7. In a gluten washer, a tank, a shaft in the tank and means for rotating the same, a cross member, a crank connecting the cross member to the shaft, means for holding the cross member from turning with the crank, a cage on the cross member, and means for spraying a washing liquid in the cage.

8. The structure defined in claim 7 in further combination with a holder on the cross member in which the cage is removably mounted.

9. In a gluten washer, a tank having a drain, a shaft in the tank and means for rotating the same, a cross member, a crank connecting the cross member to the shaft, a pair of cages on the member in balanced relation, a stem on the cross member, a guide for the stem, and means for spraying a washing liquid in the cages.

10. In a gluten washer, a tank having a drain, a shaft in the tank and means for rotating the same, a cross member, a crank intermediately connecting said member to the shaft, a pair of cages on the cross member in balanced relation, a stem on the arm, a guide for the stem, and means for spraying a washing liquid in the cages.

11. In a gluten washer, a tank having a drain, a shaft in the tank and means for rotating the same, a cross member, a crank intermediately connecting the cross member to the shaft, a pair of cages on the cross member in balanced relation, a pair of laterally spaced water supply pipes having nozzles arranged to spray water into the cages, a stem on the cross member extending between the water pipes, and a spring yieldingly holding the stem against one of the water pipes with freedom for endwise movement.

In testimony whereof I affix my signature.

EDWARD J. SISSER.